United States Patent
Girish (10) Patent No.: US 11,729,466 B2
(45) Date of Patent: *Aug. 15, 2023

(54) AUTOMATIC DIGITAL VIDEO RECORDER SCHEDULING

(71) Applicant: ARRIS Enterprises LLC, Suwanee, GA (US)

(72) Inventor: Praveen Girish, Bangalore (IN)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/703,166

(22) Filed: Mar. 24, 2022

(65) Prior Publication Data

US 2022/0217443 A1 Jul. 7, 2022

Related U.S. Application Data

(63) Continuation of application No. 15/631,599, filed on Jun. 23, 2017, now Pat. No. 11,317,151.
(Continued)

(51) Int. Cl.
*H04N 21/458* (2011.01)
*H04N 21/4147* (2011.01)
(Continued)

(52) U.S. Cl.
CPC ......... *H04N 21/458* (2013.01); *H04L 67/535* (2022.05); *H04N 5/76* (2013.01);
(Continued)

(58) Field of Classification Search
CPC .. H04N 5/76; H04N 21/44204; H04N 21/458; H04N 21/4147; H04N 21/4334; H04L 67/535; H04L 67/22
(Continued)

(56) References Cited

U.S. PATENT DOCUMENTS 7,646,962 B1 * 1/2010 Ellis .................. H04N 21/4756
386/248
8,989,561 B1 * 3/2015 Radloff .................. H04N 5/765
386/292

(Continued)

*Primary Examiner* — Thai Q Tran
*Assistant Examiner* — Nienru Yang
(74) *Attorney, Agent, or Firm* — Panitch Schwarze Belisario & Nadel LLP (57) ABSTRACT

Methods, systems, and computer readable media may be operable to facilitate recording scheduling based on calendar information. A multimedia device may track viewing history by one or more devices and/or one or more users, and the multimedia device may maintain a view count for one or more programs being viewed at certain times. The multimedia device may receive calendar information associated with one or more users, wherein the calendar information includes one or more calendar entries. The multimedia device may determine whether any time slots associated with the calendar entries overlap or encompass any time slots associated with one or more programs that are typically viewed according to the viewing history, and if a time slot associated with a calendar entry does overlap or encompass a time slot of one or more programs, the multimedia device may automatically schedule the one or more programs for recording.

20 Claims, 7 Drawing Sheets

Related U.S. Application Data (60) Provisional application No. 62/353,878, filed on Jun. 23, 2016.

(51) Int. Cl.
    *H04N 5/76*      (2006.01)
    *H04N 21/433*    (2011.01)
    *H04N 21/442*    (2011.01)
    *H04L 67/50*     (2022.01)

(52) U.S. Cl.
    CPC ..... *H04N 21/4147* (2013.01); *H04N 21/4334* (2013.01); *H04N 21/44204* (2013.01)

(58) Field of Classification Search
    USPC .......................................................... 386/296
    See application file for complete search history.

(56) References Cited

U.S. PATENT DOCUMENTS

| | | |
|---|---|---|
| 2002/0194194 A1 | 12/2002 | Fenton et al. |
| 2006/0206912 A1* | 9/2006 | Klarfeld ............. H04N 21/4823 725/39 |
| 2007/0077920 A1 | 4/2007 | Weeks et al. |
| 2007/0150502 A1 | 6/2007 | Bloebaum et al. |
| 2009/0187951 A1 | 7/2009 | Mccarthy et al. |
| 2009/0282428 A1 | 11/2009 | Rodriguez |
| 2011/0197236 A1 | 8/2011 | Rao |
| 2014/0075284 A1 | 3/2014 | Logtenberg |
| 2015/0149452 A1 | 5/2015 | Warner |
| 2016/0014461 A1 | 1/2016 | Leech et al. |

* cited by examiner

AUTOMATIC DIGITAL VIDEO RECORDER SCHEDULING

CROSS REFERENCE TO RELATED APPLICATION

This application is a continuation application to and claims priority to U.S. Application Ser. No. 15/631,599, filed Jun. 23, 2017, which is a non-provisional application claiming the benefit of U.S. Provisional Application Ser. No. 62/353,878, entitled "Method to Improvise Media Availability," which was filed on Jun. 23, 2016, and is incorporated herein by reference in its entirety.

TECHNICAL FIELD

This disclosure relates to automatic digital video recorder scheduling.

BACKGROUND

Media storage may be provided to a subscriber in the form of a recording device (e.g., digital video recorder (DVR), personal video recorder (PVR), or a network DVR (nDVR)). Typically, through a recording device, users are able to schedule programs of interest for recording and storing at the recording device. However, in certain instances, a user may forget or may be unable to schedule the recording of one or more programs of interest. For example, when a user is busy or otherwise away from the recording device, the user may be unable to schedule a recording of one or more programs of interest. Therefore, a need exists for methods and systems operable to facilitate automatic recording scheduling for recording devices.

BRIEF DESCRIPTION OF THE DRAWINGS

Like reference numbers and designations in the various drawings indicate like elements.

DETAILED DESCRIPTION

It is desirable to provide methods and systems operable to facilitate automatic recording scheduling for recording devices. Methods, systems, and computer readable media may be operable to facilitate recording scheduling based on calendar information. A multimedia device may track viewing history by one or more devices and/or one or more users, and the multimedia device may maintain a view count for one or more programs being viewed at certain times. The multimedia device may receive calendar information associated with one or more users, wherein the calendar information includes one or more calendar entries. The multimedia device may determine whether any time slots associated with the calendar entries overlap or encompass any time slots associated with one or more programs that are typically viewed according to the viewing history, and if a time slot associated with a calendar entry does overlap or encompass a time slot of one or more programs, the multimedia device may automatically schedule the one or more programs for recording.

It should be understood that the methods, systems, and computer readable media described herein may work equally well with either in-home DVR or with network-based DVR (e.g., nDVR). Network DVR (nDVR) storage has the benefit of keeping recorded media in the cloud. In-home DVR may be supplemented with nDVR, thereby allowing recordings to be moved to cloud storage.

Figure 1:
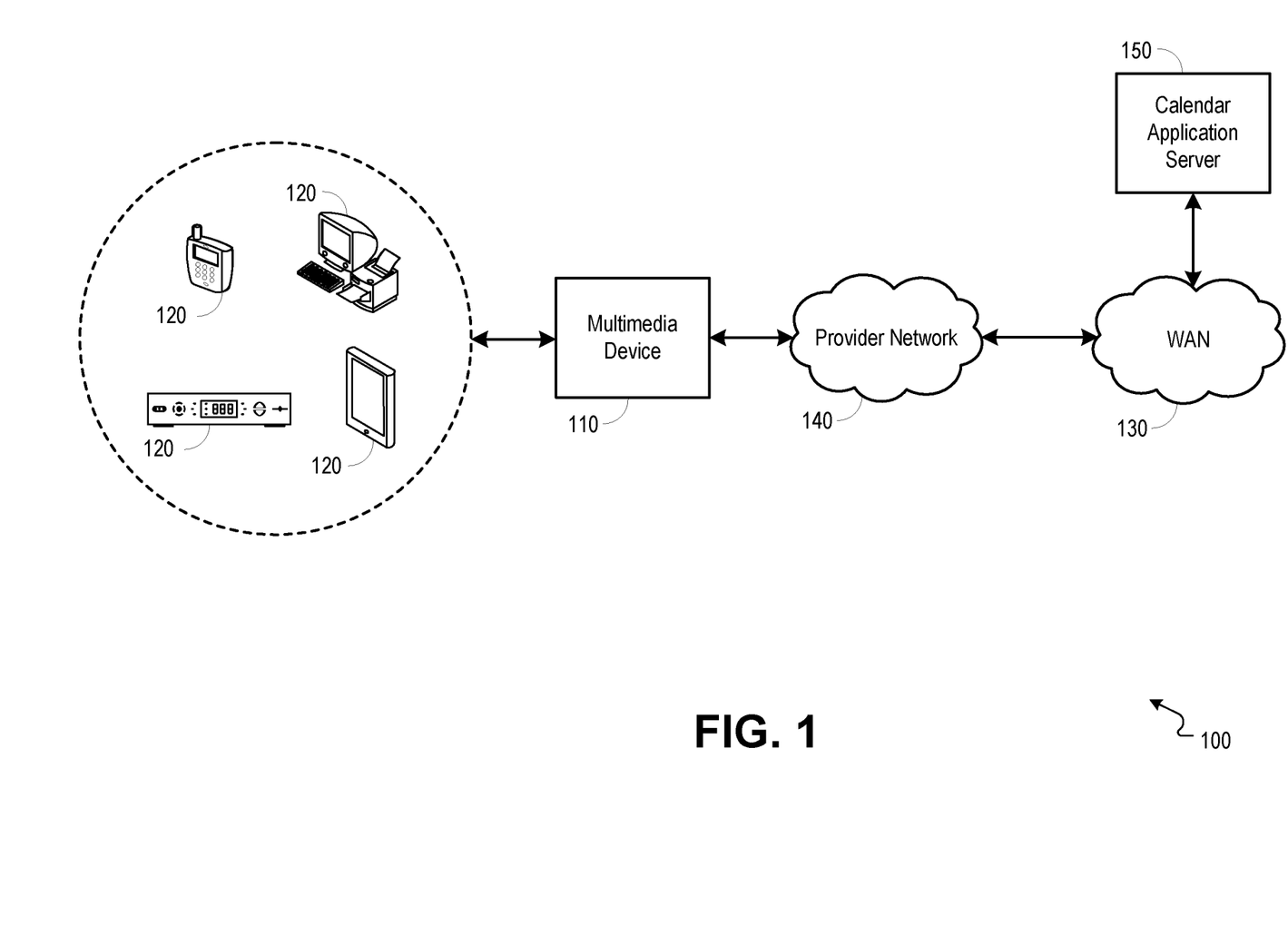
FIG. 1 is a block diagram illustrating an example network environment operable to facilitate recording scheduling based on calendar information.

FIG. 1 is a block diagram illustrating an example network environment 100 operable to facilitate recording scheduling based on calendar information. In embodiments, a multimedia device 110 may be configured to provide multimedia services to one or more client devices 120. The multimedia device 110 may include a multimedia or residential gateway, a set-top box (STB), a digital video recorder (DVR) or any other device configured to receive, store, and/or deliver multimedia content to one or more client devices 120. Client devices 120 may include televisions, computers, tablets, mobile devices, STBs, game consoles, and any other device configured to receive a multimedia service.

In embodiments, multimedia content may be delivered from a multimedia device 110 to one or more client devices 120 over a local network (e.g., a local area network (LAN), a wireless local area network (WLAN), a personal area network (PAN), etc.). The multimedia device 110 may receive services from and may communicate with an upstream wide area network (WAN) 130 through a connection to a provider network 140. It should be understood that the multimedia device 110 may operate as an access point to wirelessly deliver multimedia content to one or more client devices 120 that are associated with the multimedia device 110 as stations.

In embodiments, a multimedia device 110 may communicate with a client device 120 over a wired or a wireless connection. The multimedia device 110 may provide one or more channels or service sets through which services and communications may be delivered wirelessly to one or more client devices 120. A client device 120 may associate and authenticate with a multimedia device 110 or associated access point (e.g., wireless router, network extender, etc.), after which communications and services may be delivered from the multimedia device 110 to the client device 120. It should be understood that various protocols and/or standards (e.g., Wi-Fi, multimedia over coax alliance (MoCA), ZigBee etc.) may be used to deliver communications between a multimedia device 110 and client device 120. It should be further understood that a client device 120 may be physically connected to a multimedia device 110.

A multimedia device 110 may output live or linear content to a client device 120 as the content is received at the multimedia device 110, or the multimedia device 110 may store content and output the stored content to a client device 120 at a later time. For example, content may be transcoded and stored at the multimedia device 110, wherein the content is conditioned or transcoded into a format that is compatible with one or more client devices 120. The multimedia device 110 may include storage for storing recorded pieces of content, and/or recorded content may be stored at another device (e.g., external storage device, upstream server, nDVR, etc.).

With the advent of media streaming devices such as smart phones and tablets, users are provided with a variety of devices, web services/servers, and avenues for accessing and maintaining schedules and/or calendars. For example, users may maintain a schedule (e.g., meetings, restaurant reservations, vacations, outings, movie plans, etc.) on a digital calendar, and the digital calendar may be maintained at one or more client devices 120, external servers, or calendar application server 150 (e.g., a cloud based application such as a calendar application). The digital calendar may be updated based upon a user's messages (e.g., emails, text messages, and other applications monitoring events such as movie ticket purchases, flight itinerary, etc.).

Utilizing data that may be included within a calendar of a user, the user's schedule may be derived. For example, based on items or tasks included within the user's calendar, a determination may be made as to when the user may be at home or when the user may be away from home, or when the user may otherwise be busy.

The users of a multimedia device 110 (e.g., set-top box (STB), gateway, or other device with DVR capability) or a client device 120 may have a routine in which the users view a particular program or particular type of program being aired on a particular service at a particular time. In embodiments, a multimedia device 110 may maintain a database of program-service information being viewed on a device (e.g., multimedia device 110 or client device 120). For example, each time that a service or program is tuned and viewed for at least a threshold duration of time (e.g., three (3), four (4), five (5) minutes, etc.), the multimedia device 110 may add an entry into the database if a corresponding entry does not exist, or if a corresponding entry does exist, the multimedia device 110 may update the existing entry.

In embodiments, an entry in the database may include program identification information (e.g., service/channel number, program title, program genre, etc.), time slot information (e.g., start time, duration, end time, etc.), and a view count value. Program identification information associated with a program may be retrieved from EPG (electronic program guide) data or directly from a stream over which the program is received. Time slot information associated with a program may be retrieved from EPG data, from a stream over which the program is received, or may be determined based upon a time at which the program is tuned to. When an entry is created in the database, the entry may be given a view count value of one (1), and each time that a program corresponding with the entry is subsequently tuned to for the threshold duration of time, the view count value associated with the entry may be incremented (e.g., incremented by a value of one (1)) to reflect the number of times the program has been viewed by a user.

In embodiments, the multimedia device 110 may be configured to receive calendar data associated with one or more users having access to the multimedia device 110. For example, the multimedia device 110 may be synced with a calendar application that stores a user's calendar data, or the multimedia device 110 may be configured with credentials required for accessing a calendar application that stores a user's calendar data. The multimedia device 110 may receive calendar data (e.g., calendar entries for events including information identifying a day and/or time associated with the calendar entry). For example, the multimedia device 110 may periodically retrieve calendar data and/or calendar updates from one or more client devices 120 or external servers (e.g., calendar application server 150) upon which calendar entries associated with one or more users are stored. As another example, a calendar application (e.g., a calendar application at a client device 120 or an external server such as the calendar application server 150) may periodically push calendar data and/or calendar updates to the multimedia device 110, or the calendar application may provide calendar updates to the multimedia device 110 when a new calendar entry is input into a user's digital calendar.

In embodiments, the multimedia device 110 may identify a time slot associated with each calendar entry associated with calendar data of one or more users, and the multimedia device 110 may determine whether the identified time slot encompasses or overlaps a time slot associated with one or more programs that are included as entries within the database (e.g., the database of program-service information being viewed on a device). For example, the multimedia device 110 may compare the time slot associated with a calendar entry to one or more time slots associated with one or more programs that are included as entries within the database. If the determination is made that the time slot associated with a calendar entry encompasses or overlaps a time slot associated with a program that is included within the database, the multimedia device 110 may schedule a recording of the program, if the program is not already scheduled for recording. Where multiple users having different calendar information have access to one or more multimedia devices 110 or client devices 120 within a premise, a multimedia device 110 may detect a calendar event compromising a plurality of the users, and in response, the multimedia device 110 may schedule the recording of multiple programs associated with the compromised users.

In embodiments, multiple entries may exist within the database for a particular time slot. When the multimedia device 110 determines that a time slot associated with a calendar entry encompasses or overlaps a time slot associated with multiple programs that are included within the database, the multimedia device 110 may select one or more of the multiple programs for recording. The selection of the one or more programs may be based upon the number of tuners available to the multimedia device 110 for recording content and view count values associated with each of the multiple programs. For example, the multimedia device 110 may select a number of programs for recording, wherein the number is equivalent to or less than a number of tuners that are available to the multimedia device 110. The multimedia device 110 may select the one or more programs having the highest view count values respective to the view count values of each of the multiple programs having a time slot which the time slot of the calendar entry encompasses or overlaps.

In embodiments, the multimedia device 110 may provide feedback/update to a user when a program is scheduled for recording based upon an identification of a conflict between a calendar entry and a program that is included within the database. For example, the multimedia device 110 may output an update to a calendar application (e.g., calendar application run at a client device 120, calendar application server 150, or an MSO (multiple systems operator) proxy calendar server) associated with the user (e.g., the calendar entry creating a conflict with one or more program time slots may be updated to notify the user that the one or more programs have been scheduled for recording based upon the time slot occupied by the calendar entry). The information added to the calendar application may be added as metadata and may include information associated with the program scheduled for recording (e.g., program name, program duration, program service or channel number, etc.), thereby allowing the user to identify the program scheduled for recording. As another example, the multimedia device 110 may output a notification to an associated display screen, wherein the notification informs a user of the one or more recordings that have been scheduled based upon the time slot occupied by a calendar entry. The notification may provide a user with an option to either confirm or cancel the scheduled recording.

Figure 2:
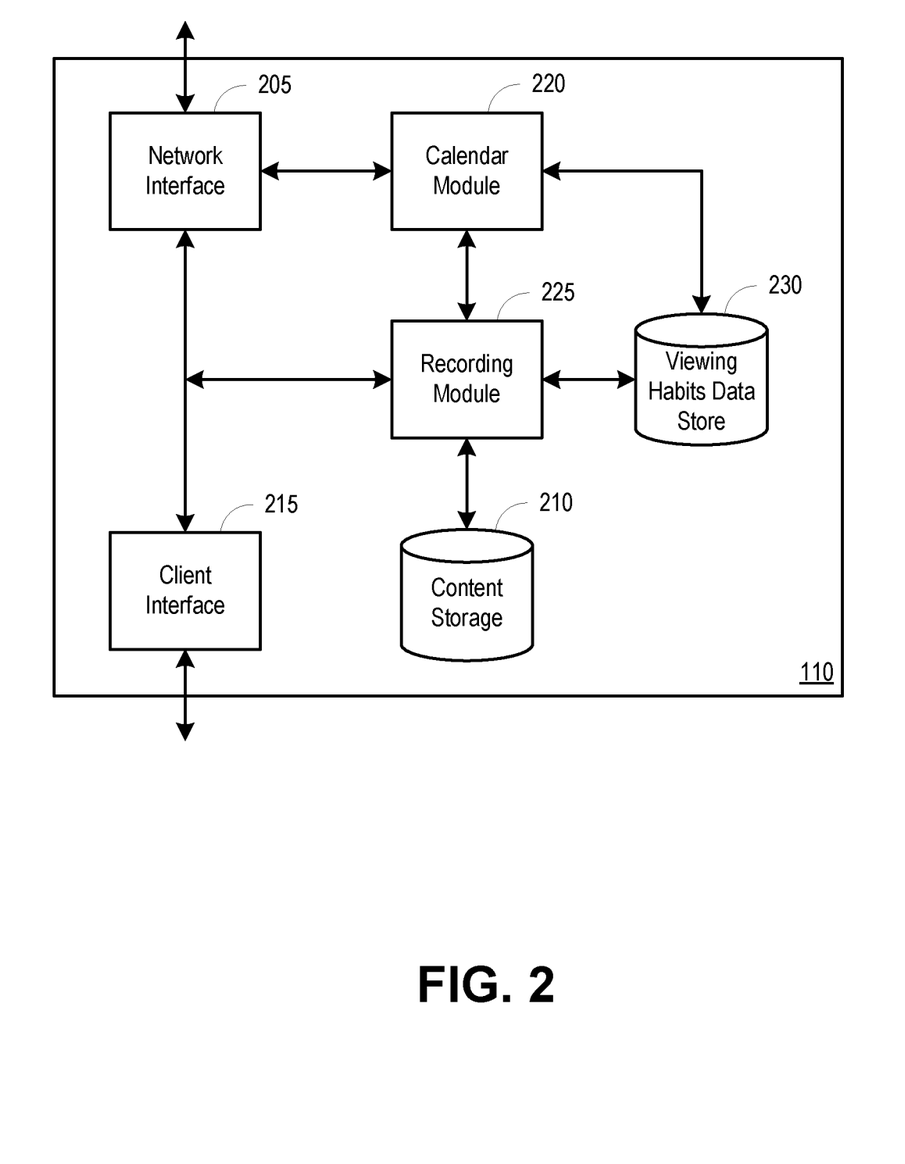
FIG. 2 is a block diagram illustrating an example multimedia device operable to facilitate recording scheduling based on calendar information.

FIG. 2 is a block diagram illustrating an example multimedia device 110 operable to facilitate recording scheduling based on calendar information. The multimedia device 110 may include a network interface 205, content storage 210, a client interface 215, a calendar module 220, a recording module 225, and a viewing habits data store 230. The multimedia device 110 may include a multimedia or residential gateway, a set-top box (STB), or any other device configured to receive, store, and/or deliver multimedia content to one or more client devices 120 of FIG. 1.

In embodiments, the multimedia device 110 may communicate with one or more client devices 120 over a wired or a wireless connection through the client interface 215. The multimedia device 110 may output content and/or other services to client devices 120 through the client interface 215 and may receive requests for content and/or other upstream communications through the client interface 215. It should be understood that the client interface 215 may include various wired and/or wireless interfaces using various protocols and/or standards (e.g., Wi-Fi, multimedia over coax alliance (MoCA), ZigBee, Ethernet, etc.) to deliver communications between a multimedia device 110 and client device(s) 120. For example, the multimedia device 110 may communicate with one or more client devices 120 over a local network.

In embodiments, content may be received at the multimedia device 110 from an upstream network (e.g., provider network 140 of FIG. 1, WAN 130 of FIG. 1, etc.) and/or upstream server (e.g., calendar application server 150 of FIG. 1) through the network interface 205. Communications and services received through the network interface 205 may be forwarded to one or more client devices 120 through the client interface 215. For example, content streams (e.g., live or linear content, VoD content, recorded content, etc.) may be recorded by a recording module 225 and stored at content storage 210 (e.g., DVR storage), and/or the content streams may be forwarded to one or more client devices 120 through the client interface 215.

In embodiments, a recording module 225 may maintain a database of program-service information being viewed on a device (e.g., multimedia device 110 or client device 120). For example, each time that a service or program is tuned and viewed for at least a threshold duration of time (e.g., three (3), four (4), five (5) minutes, etc.), the recording module 225 may add an entry into the database if a corresponding entry does not exist, or if a corresponding entry does exist, the recording module 225 may update the existing entry. The database of program-service information may be stored and maintained at a viewing habits data store 230.

In embodiments, an entry in the database may include program identification information (e.g., service/channel number, program title, program genre, etc.), time slot information (e.g., start time, duration, end time, etc.), and a view count value. Program identification information associated with a program may be retrieved (e.g., by the recording module 225) from EPG (electronic program guide) data or directly from a stream over which the program is received. Time slot information associated with a program may be retrieved (e.g., by the recording module 225) from EPG data, from a stream over which the program is received, or may be determined based upon a time at which the program is tuned to. When an entry is created in the database, the entry may be given a view count value of one (1), and each time that a program corresponding with the entry is subsequently tuned to for the threshold duration of time, the view count value associated with the entry may be incremented (e.g., incremented by a value of one (1)) to reflect the number of times the program has been viewed by a user.

In embodiments, the calendar module 220 may be configured to receive calendar data associated with one or more users having access to the multimedia device 110. For example, the calendar module 220 may be synced with a calendar application that stores a user's calendar data, or the calendar module 220 may be configured with credentials required for accessing a calendar application that stores a user's calendar data. The calendar module 220 may receive calendar data (e.g., calendar entries for events including information identifying a day and/or time associated with the calendar entry). For example, the calendar module 220 may periodically retrieve calendar data and/or calendar updates from one or more client devices 120 or external servers (e.g., calendar application server 150) upon which calendar entries associated with one or more users are stored. As another example, a calendar application (e.g., a calendar application at a client device 120 or an external server such as the calendar application server 150) may periodically push calendar data and/or calendar updates to the calendar module 220, or the calendar application may provide calendar updates to the calendar module 220 when a new calendar entry is input into a user's digital calendar.

In embodiments, the calendar module 220 may identify a time slot associated with each calendar entry associated with calendar data of one or more users, and the calendar module 220 may determine whether the identified time slot encompasses or overlaps a time slot associated with one or more programs that are included as entries within the database (e.g., the database stored at the viewing habits data store and including program-service information for programming viewed on one or more devices). For example, the calendar module 220 may compare the time slot associated with a calendar entry to one or more time slots associated with one or more programs that are included as entries within the database. If the determination is made that the time slot associated with a calendar entry encompasses or overlaps a time slot associated with a program that is included within the database, the calendar module 220 may schedule a recording of the program, if the program is not already scheduled for recording. For example, the calendar module 220 may instruct the recording module 225 to record the identified program. Where multiple users having different calendar information have access to one or more multimedia devices 110 or client devices 120 within a premise, the calendar module 220 may detect a calendar event compromising a plurality of the users, and in response, the calendar module 220 may schedule the recording of multiple programs associated with the compromised users.

In embodiments, multiple entries may exist within the database for a particular time slot. When the calendar module 220 determines that a time slot associated with a calendar entry encompasses or overlaps a time slot associated with multiple programs that are included within the database, the calendar module 220 may select one or more of the multiple programs for recording. The selection of the one or more programs may be based upon the number of tuners available to the multimedia device 110 for recording content and view count values associated with each of the multiple programs. For example, the calendar module 220 may select a number of programs for recording, wherein the number is equivalent to or less than a number of tuners that are available to the multimedia device 110. The calendar module 220 may select the one or more programs having the highest view count values respective to the view count values of each of the multiple programs having a time slot which the time slot of the calendar entry encompasses or overlaps.

In embodiments, the multimedia device 110 may provide feedback/update to a user when a program is scheduled for recording based upon an identification of a conflict between a calendar entry and a program that is included within the database. For example, the multimedia device 110 may output (e.g., through the network interface 205) an update to a calendar application (e.g., calendar application run at a client device 120, calendar application server 150, or an MSO (multiple systems operator) proxy calendar server) associated with the user (e.g., the calendar entry creating a conflict with one or more program time slots may be updated to notify the user that the one or more programs have been scheduled for recording based upon the time slot occupied by the calendar entry). The information added to the calendar application may be added as metadata and may include information associated with the program scheduled for recording (e.g., program name, program duration, program service or channel number, etc.), thereby allowing the user to identify the program scheduled for recording. As another example, the multimedia device 110 may output a notification to an associated display screen (e.g., through the client interface 215), wherein the notification informs a user of the one or more recordings that have been scheduled based upon the time slot occupied by a calendar entry. The notification may provide a user with an option to either confirm or cancel the scheduled recording.

Figure 3:
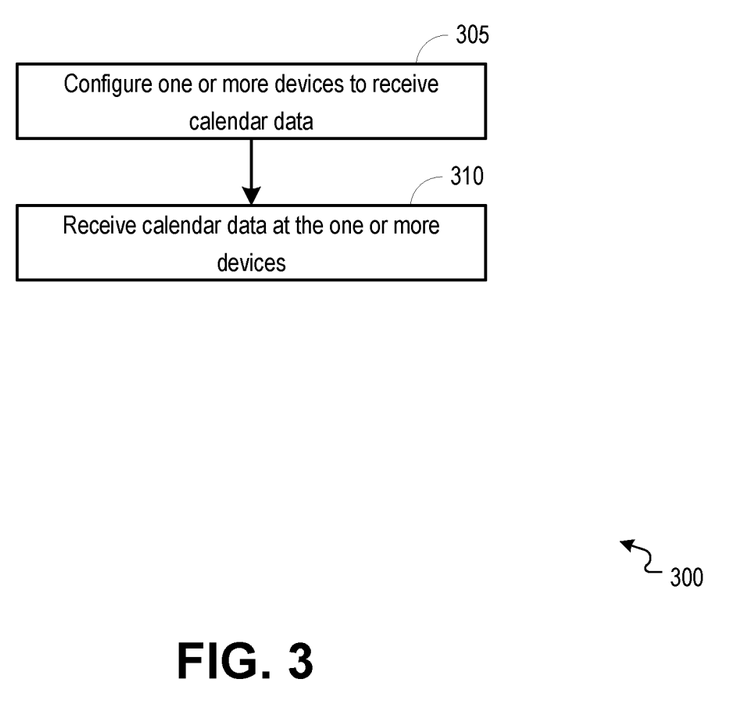
FIG. 3 is a flowchart illustrating an example process operable to facilitate a reception of calendar data by a multimedia device.

FIG. 3 is a flowchart illustrating an example process 300 operable to facilitate a reception of calendar data by a multimedia device. The process 300 can begin at 305, when one or more devices are configured to receive calendar data. For example, a multimedia device 110 of FIG. 1 (e.g., a calendar module 220 of FIG. 2) may be configured to receive calendar data from a calendar application that is run at another device (e.g., client device 120 of FIG. 1), a cloud-based server (e.g., calendar application server 150 of FIG. 1), or other device or server storing and/or maintaining calendar data associated with one or more users. In embodiments, the calendar module 220 may be configured to receive calendar data associated with one or more users having access to the multimedia device 110. For example, the calendar module 220 may be synced with a calendar application that stores a user's calendar data, or the calendar module 220 may be configured with credentials required for accessing a calendar application that stores a user's calendar data.

At 310, calendar data may be received at one or more devices. Calendar data may be received, for example, by a multimedia device 110 (e.g., at a calendar module 220). In embodiments, the calendar module 220 may receive calendar data (e.g., calendar entries for events including information identifying a day and/or time associated with the calendar entry). For example, the calendar module 220 may periodically retrieve calendar data and/or calendar updates from one or more client devices 120 or external servers (e.g., calendar application server 150) upon which calendar entries associated with one or more users are stored. As another example, a calendar application (e.g., a calendar application at a client device 120 or an external server such as the calendar application server 150) may periodically push calendar data and/or calendar updates to the calendar module 220, or the calendar application may provide calendar updates to the calendar module 220 when a new calendar entry is input into a user's digital calendar.

Figure 4:
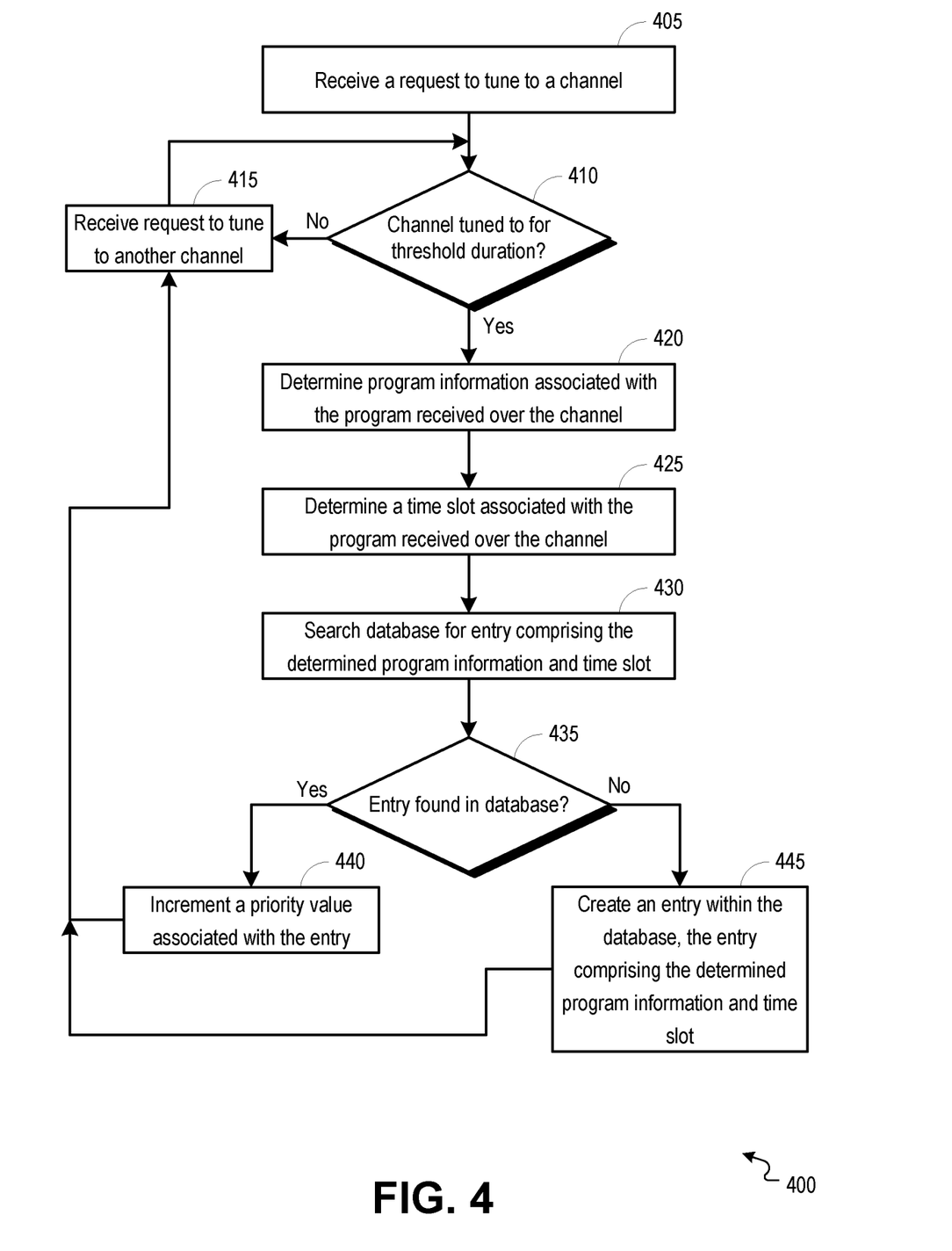
FIG. 4 is a flowchart illustrating an example process operable to facilitate the creation and management of a database including program information for programs viewed at one or more devices.

FIG. 4 is a flowchart illustrating an example process 400 operable to facilitate the creation and management of a database including program information for programs viewed at one or more devices. The process 400 can begin at 405, when a request is received to tune to a channel. The request to tune to a channel may be received, for example, by a multimedia device 110 of FIG. 1. In embodiments, the multimedia device 110 may tune to the channel in response to receiving the request.

At 410, a determination may be made whether the channel is tuned to for at least a threshold duration. The determination whether the channel is tuned to for at least a threshold duration may be made, for example, by the multimedia device 110 of FIG. 1 (e.g., by a recording module 225 of FIG. 2). In embodiments, the multimedia device 110 may be configured with the threshold duration of time, and it will be appreciated by those skilled in the relevant art that the threshold duration of time may be one of various durations (e.g., three (3), four (4), five (5) minutes, etc.). If the determination is made that the channel is not tuned to for at least the threshold duration, the multimedia device may wait until a request to tune to another channel is received at 415.

If, at 410, the determination is made that the channel is tuned to for at least the threshold duration, the process 400 may proceed to 420. At 420, program information associated with the program received over the channel may be determined. Program information associated with the program may be determined, for example, by the multimedia device 110 (e.g., by the recording module 225). In embodiments, program information may include program identification information (e.g., service/channel number, program title, program genre, etc.) and or other information associated with the program. The program information may be retrieved by the recording module 225 from EPG (electronic program guide) data or directly from a stream over which the program is received.

At 425, a time slot associated with the program received over the channel may be determined. The time slot may be determined, for example, by the multimedia device 110 (e.g., by the recording module 225). In embodiments, the time slot may include a start time, duration, and/or end time of the program. The time slot may be retrieved by the recording module 225 from EPG (electronic program guide) data or directly from a stream over which the program is received, or the time slot may be determined based upon a time at which the request to tune to the channel was received by the multimedia device 110.

At 430, a database may be searched for an entry comprising the determined program information and time slot. The database may be a database of program-service information associated with programs that are being or that have been viewed through the multimedia device 110 or an associated device (e.g., client device 120 of FIG. 1), and each entry of the database may include program information and a time slot associated with a prior viewing of a program.

In embodiments, the database may be stored at the multimedia device 110 (e.g., at the viewing habits data store 230). The database may be searched, for example, by the multimedia device 110 (e.g., by the recording module 225).

At 435, a determination may be made whether an entry comprising the determined program information and time slot is found in the database. The determination whether an entry comprising the determined program information and time slot is found in the database may be made, for example, by the multimedia device 110 (e.g., by the recording module 225).

If, at 435, the determination is made that an entry comprising the determined program information and time slot is found in the database, the process 400 may proceed to 440. At 440, a priority value associated with the entry may be incremented. The priority value (e.g., view count value) may be a value stored at the entry and may indicate the number of times the associated program has been viewed by the user at the associated time slot. The priority value may be incremented, for example, by the multimedia device 110 (e.g., by the recording module 225). After the priority value associated with the entry has been incremented, the multimedia device may wait until a request to tune to another channel is received at 415.

If, at 435, the determination is made that an entry comprising the determined program information and time slot is not found in the database, the process 400 may proceed to 445. At 445, an entry may be created within the database, wherein the entry comprises the determined program information and time slot. The newly created entry may be given an initial priority value (e.g., view count value) of one (1).

The entry may be created within the database, for example, by the multimedia device 110 (e.g., by the recording module 225). After the entry has been created within the database, the multimedia device may wait until a request to tune to another channel is received at 415.

Figure 5:
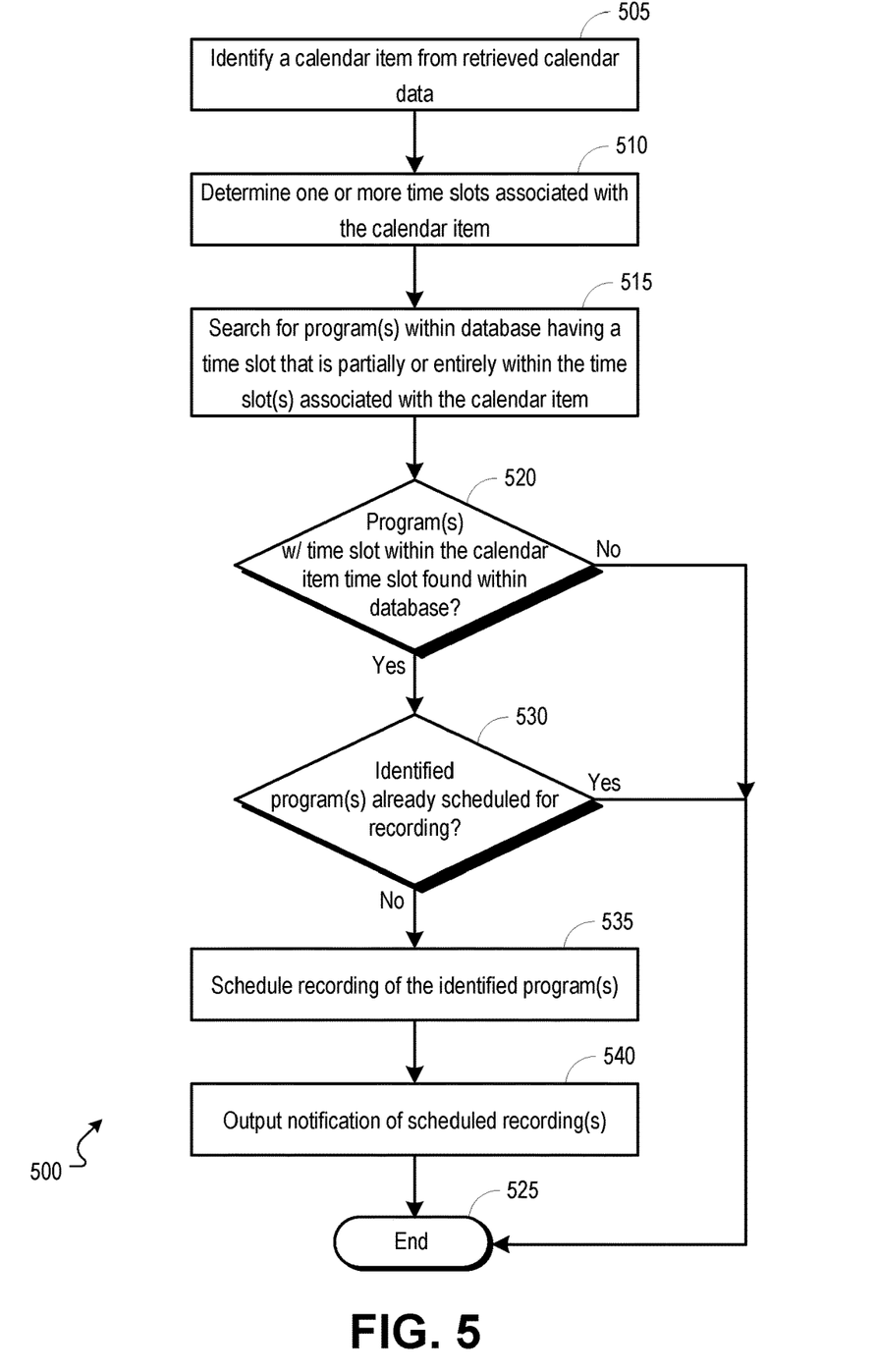
FIG. 5 is a flowchart illustrating an example process operable to facilitate the scheduling of one or more recordings based upon an identification of a calendar conflict.

FIG. 5 is a flowchart illustrating an example process 500 operable to facilitate the scheduling of one or more recordings based upon an identification of a calendar conflict. The process 500 can begin at 505, when a calendar item is identified from retrieved calendar data. The calendar item may be identified, for example, by a multimedia device 110 of FIG. 1 (e.g., by a calendar module 220 of FIG. 2). In embodiments, the multimedia device 110 may receive calendar data associated with one or more users having access to the multimedia device 110. The calendar data may be received from one or more calendar applications that store user calendar data (e.g., an application run at a client device 120 of FIG. 1, cloud-based server such as a calendar application server 150 of FIG. 1, or other device/server, etc.). The calendar data may include one or more calendar items having an associated time slot during which the entry is scheduled to occur.

At 510, one or more time slots associated with the calendar item may be determined. The one or more time slots associated with the calendar item may be determined, for example, by the multimedia device 110 (e.g., by the calendar module 220). In embodiments, the calendar module 220 may identify one or more time slots (e.g., fifteen (15), thirty (30), sixty (60) minute time slots, etc.) that are included within or that overlap the period of time for which the calendar item is scheduled.

At 515, a database may be searched for one or more programs having a time slot that is partially or entirely within the time slot(s) associated with the calendar item. The database (e.g., a database stored at the viewing habits data store 230 of FIG. 1 and including program-service information for programming viewed on one or more devices) may be searched, for example, by the calendar module 220. In embodiments, the calendar module 220 may search for an entry within the database, the entry having an associated time slot that is partially or entirely within the time slot(s) associated with the calendar item.

At 520, a determination may be made whether one or more programs having a time slot that is partially or entirely within the time slot(s) associated with the calendar item is found within the database. The determination whether one or more programs having a time slot that is partially or entirely within the time slot(s) associated with the calendar item is found within the database may be made, for example, by the calendar module 220. In embodiments, the calendar module 220 may compare the time slot(s) associated with the calendar item to one or more time slots associated with one or more entries within the database. If the determination is made that no program having a time slot that is partially or entirely within the time slot(s) associated with the calendar item is found within the database, the process 500 may end at 525.

If, at 520, the determination is made that at least one program having a time slot that is partially or entirely within the time slot(s) associated with the calendar item is found within the database, the process 500 may proceed to 530. At 530, a determination may be made whether the one or more identified programs (e.g., the program(s) identified at 520 as having a time slot partially or entirely within the time slot(s) associated with the calendar item) are already scheduled for recording. The determination whether the one or more identified programs are already scheduled for recording may be made, for example, by the calendar module 220. In embodiments, the calendar module 220 may check with a recording module (e.g., recording module 225 of FIG. 2) to determine whether the one or more identified programs are already scheduled for recording. If the determination is made that the one or more identified programs are already scheduled for recording, the process 500 may end at 525.

If, at 530, the determination is made that the one or more identified programs are not already scheduled for recording, the process 500 may proceed to 535. At 535, recordings of the one or more identified programs may be scheduled. The recordings of the one or more identified programs may be scheduled, for example, by the recording module 225. In embodiments, the calendar module 220 may instruct the recording module 225 to record the one or more identified programs at a time during which an associated multimedia device 110 is scheduled to receive the program(s).

At 540, a notification of the scheduling of the recording(s) may be output. The notification of the scheduling of the recording(s) may be output, for example, from the multimedia device 110 to a display or to another device. In embodiments, the multimedia device 110 may output an update to a calendar application (e.g., calendar application run at a client device 120 of FIG. 1, calendar application server 150 of FIG. 1, or an MSO (multiple systems operator) proxy calendar server) associated with the user (e.g., the calendar entry creating a conflict with one or more program time slots may be updated to notify the user that the one or more programs have been scheduled for recording based upon the time slot occupied by the calendar entry). As another example, the multimedia device 110 may output a notification to an associated display screen, wherein the notification informs a user of the one or more recordings that have been scheduled based upon the time slot occupied by a calendar item. The notification may provide a user with an option to either confirm or cancel the scheduled recording.

Figure 6:
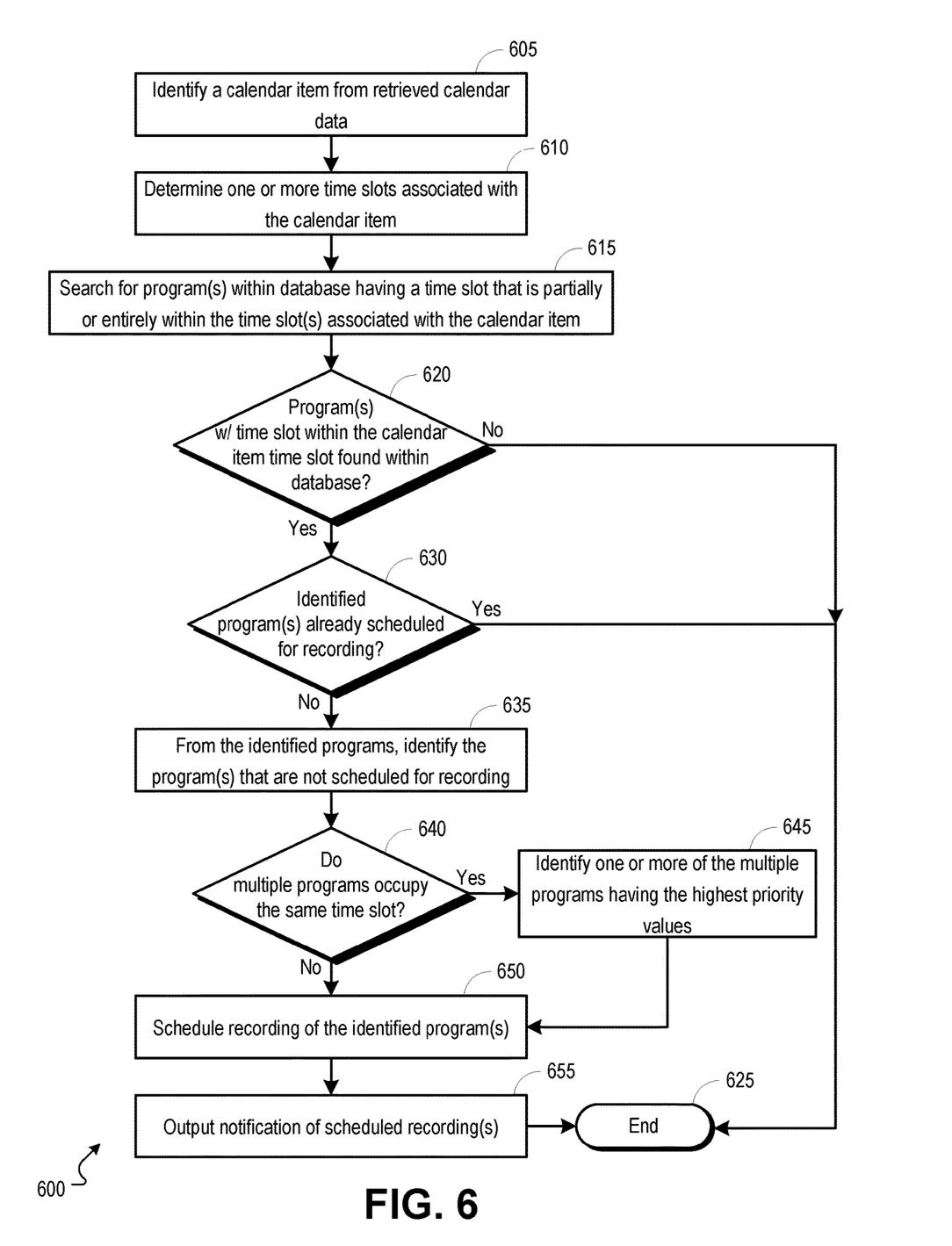
FIG. 6 is a flowchart illustrating an example process operable to facilitate the scheduling of one or more recordings based upon an identification of a calendar conflict and a priority score associated with one or more programs that are to be recorded.

FIG. 6 is a flowchart illustrating an example process 600 operable to facilitate the scheduling of one or more recordings based upon an identification of a calendar conflict and a priority score associated with one or more programs that are to be recorded. The process 600 can begin at 605, when a calendar item is identified from retrieved calendar data. The calendar item may be identified, for example, by a multimedia device 110 of FIG. 1 (e.g., by a calendar module 220 of FIG. 2). In embodiments, the multimedia device 110 may receive calendar data associated with one or more users having access to the multimedia device 110. The calendar data may be received from one or more calendar applications that store user calendar data (e.g., an application run at a client device 120 of FIG. 1, cloud-based server such as a calendar application server 150 of FIG. 1, or other device/server, etc.). The calendar data may include one or more calendar items having an associated time slot during which the entry is scheduled to occur.

At 610, one or more time slots associated with the calendar item may be determined. The one or more time slots associated with the calendar item may be determined, for example, by the multimedia device 110 (e.g., by the calendar module 220). In embodiments, the calendar module 220 may identify one or more time slots (e.g., fifteen (15), thirty (30), sixty (60) minute time slots, etc.) that are included within or that overlap the period of time for which the calendar item is scheduled.

At 615, a database may be searched for one or more programs having a time slot that is partially or entirely within the time slot(s) associated with the calendar item. The database (e.g., a database stored at the viewing habits data store 230 of FIG. 1 and including program-service information for programming viewed on one or more devices) may be searched, for example, by the calendar module 220. In embodiments, the calendar module 220 may search for an entry within the database, the entry having an associated time slot that is partially or entirely within the time slot(s) associated with the calendar item.

At 620, a determination may be made whether one or more programs having a time slot that is partially or entirely within the time slot(s) associated with the calendar item is found within the database. The determination whether one or more programs having a time slot that is partially or entirely within the time slot(s) associated with the calendar item is found within the database may be made, for example, by the calendar module 220. In embodiments, the calendar module 220 may compare the time slot(s) associated with the calendar item to one or more time slots associated with one or more entries within the database. If the determination is made that no program having a time slot that is partially or entirely within the time slot(s) associated with the calendar item is found within the database, the process 600 may end at 625.

If, at 620, the determination is made that at least one program having a time slot that is partially or entirely within the time slot(s) associated with the calendar item is found within the database, the process 600 may proceed to 630. At 630, a determination may be made whether the one or more identified programs (e.g., the program(s) identified at 620 as having a time slot partially or entirely within the time slot(s) associated with the calendar item) are already scheduled for recording. The determination whether the one or more identified programs are already scheduled for recording may be made, for example, by the calendar module 220. In embodiments, the calendar module 220 may check with a recording module (e.g., recording module 225 of FIG. 2) to determine whether the one or more identified programs are already scheduled for recording. If the determination is made that the one or more identified programs are already scheduled for recording, the process 600 may end at 625.

If, at 630, the determination is made that the one or more identified programs are not already scheduled for recording, the process 600 may proceed to 635. At 635, one or more of the identified programs that are not scheduled for recording may be identified. The one or more programs that are not scheduled for recording may be identified from the one or more programs identified at 620. The one or more programs that are not scheduled for recording may be identified, for example, by the recording module 225.

At 640, a determination may be made whether a plurality of the identified programs occupies the same time slot. The determination whether a plurality of the identified programs occupies the same time slot may be made, for example, by the calendar module 220 or recording module 225. In embodiments, the recording module 225 may determine whether any of the time slots associated with the programs identified for recording (e.g., the programs identified at 635) overlap each other.

If, at 640, the determination is made that a plurality of the identified programs occupies the same time slot, the process 600 may proceed to 645. At 645, one or more of the plurality of programs occupying the same time slot may be identified based upon priority values associated with the programs. The one or more programs may be identified, for example, by the calendar module 220. In embodiments, the calendar module 220 may select a number of programs for recording, wherein the number is equivalent to or less than a number of tuners that are available to the multimedia device 110. The calendar module 220 may select the one or more programs having the highest view count values (e.g., a priority value indicating the number of times the program has been viewed by a user or device, the priority value being stored at a viewing habits data store 230 of FIG. 2) respective to the view count values of each of the multiple programs having a time slot which the time slot of the calendar entry encompasses or overlaps. After identifying the one or more programs, the identified one or more programs may be scheduled for recording at 650.

If, at 640, the determination is made that none of the identified programs occupy the same time slot, the process 600 may proceed to 650. At 650, recordings of the one or more identified programs may be scheduled. The recordings of the one or more identified programs may be scheduled, for example, by the recording module 225. In embodiments, the calendar module 220 may instruct the recording module 225 to record the one or more identified programs at a time during which an associated multimedia device 110 is scheduled to receive the program(s).

At 655, a notification of the scheduling of the recording(s) may be output. The notification of the scheduling of the recording(s) may be output, for example, from the multimedia device 110 to a display or to another device. In embodiments, the multimedia device 110 may output an update to a calendar application (e.g., calendar application run at a client device 120 of FIG. 1, calendar application server 150 of FIG. 1, or an MSO (multiple systems operator) proxy calendar server) associated with the user (e.g., the calendar entry creating a conflict with one or more program time slots may be updated to notify the user that the one or more programs have been scheduled for recording based upon the time slot occupied by the calendar entry). As another example, the multimedia device 110 may output a notification to an associated display screen, wherein the notification informs a user of the one or more recordings that have been scheduled based upon the time slot occupied by a calendar item. The notification may provide a user with an option to either confirm or cancel the scheduled recording. After the notification is output, the process 600 may end at 625.

Figure 7:
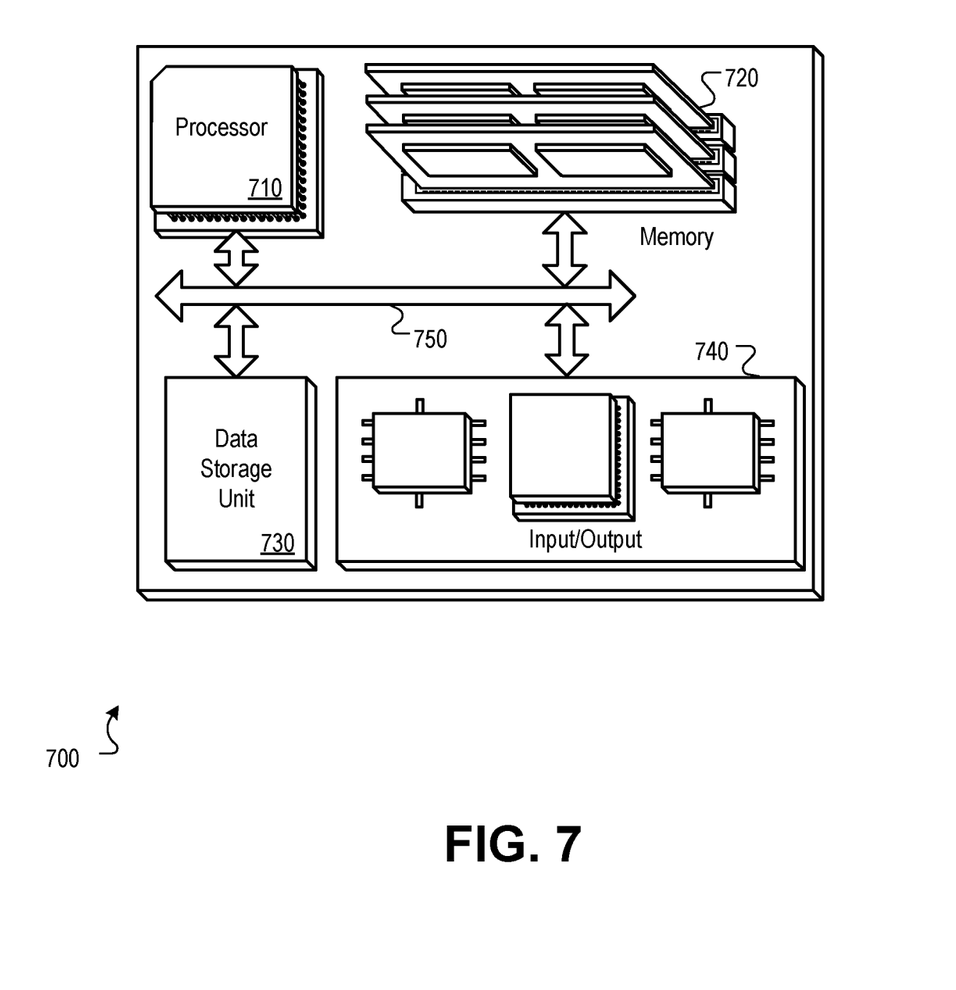
FIG. 7 is a block diagram of a hardware configuration operable to facilitate recording scheduling based on calendar information.

FIG. 7 is a block diagram of a hardware configuration 700 operable to facilitate recording scheduling based on calendar information. The hardware configuration 700 can include a processor 710, a memory 720, a storage device 730, and an input/output device 740. Each of the components 710, 720, 730, and 740 can, for example, be interconnected using a system bus 750. The processor 710 can be capable of processing instructions for execution within the hardware configuration 700. In one implementation, the processor 710 can be a single-threaded processor. In another implementation, the processor 710 can be a multi-threaded processor. The processor 710 can be capable of processing instructions stored in the memory 720 or on the storage device 730.

The memory 720 can store information within the hardware configuration 700. In one implementation, the memory 720 can be a computer-readable medium. In one implementation, the memory 720 can be a volatile memory unit. In another implementation, the memory 720 can be a non-volatile memory unit.

In some implementations, the storage device 730 can be capable of providing mass storage for the hardware configuration 700. In one implementation, the storage device 730 can be a computer-readable medium. In various different implementations, the storage device 730 can, for example, include a hard disk device, an optical disk device, flash memory or some other large capacity storage device. In other implementations, the storage device 730 can be a device external to the hardware configuration 700.

The input/output device 740 provides input/output operations for the hardware configuration 700. In one implementation, the input/output device 740 can include one or more of a network interface device (e.g., an Ethernet card), a serial communication device (e.g., an RS-232 port), one or more universal serial bus (USB) interfaces (e.g., a USB 2.0 port), one or more wireless interface devices (e.g., an 802.11 card), and/or one or more interfaces for outputting video and/or data services to a multimedia device 110 of FIG. 1 (e.g., access point, gateway device, STB, DVR or other content storage device, cable modem, router, wireless extender, or other access device) or client device 120 of FIG. 1 (e.g., STB, computer, television, tablet, mobile device, etc.). In another implementation, the input/output device can include driver devices configured to send communications to, and receive communications from one or more networks (e.g., WAN 130 of FIG. 1, local network, provider network 140 of FIG. 1, etc.).

Those skilled in the art will appreciate that the invention described herein improves upon methods and systems for automatically scheduling recordings. Methods, systems, and computer readable media may be operable to facilitate recording scheduling based on calendar information. A multimedia device may track viewing history by one or more devices and/or one or more users, and the multimedia device may maintain a view count for one or more programs being viewed at certain times. The multimedia device may receive calendar information associated with one or more users, wherein the calendar information includes one or more calendar entries. The multimedia device may determine whether any time slots associated with the calendar entries overlap or encompass any time slots associated with one or more programs that are typically viewed according to the viewing history, and if a time slot associated with a calendar entry does overlap or encompass a time slot of one or more programs, the multimedia device may automatically schedule the one or more programs for recording.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

I claim:

1. A method comprising:
    determining, by a multimedia device, whether one or more time slots associated with a calendar item overlap or encompass one or more time slots associated with one or more programs that are included within a database as a database entry, wherein the database is maintained by the multimedia device and the one or more programs are programs that have historically been viewed by one or more users; and
    when the one or more time slots associated with the calendar item overlap or encompass one or more time slots associated with one or more programs that are included within the database as a database entry, automatically selecting for recording, by the multimedia device, one or more programs from the one or more programs associated with time slots which are overlapped or encompassed by the one or more time slots associated with the calendar item, wherein the one or more programs automatically selected for recording are selected based upon a number of tuners available to the multimedia device and a priority value associated with each of the one or more programs, and automatically scheduling, by the multimedia device, a recording of the one or more programs selected for recording, wherein the one or more programs are scheduled for recording by the multimedia device.

2. The method of claim 1, further comprising:
    when the one or more time slots associated with the calendar item overlap or encompass one or more time slots associated with one or more programs that are included within the database as a database entry, determining whether one or more of the one or more programs have already been scheduled for recording; and
    when one or more of the one or more programs have already been scheduled for recording, foregoing the scheduling of the recording of the one or more programs that have already been scheduled for recording.

3. The method of claim 1, further comprising:
    when the one or more time slots associated with the calendar item overlap or encompass one or more time slots associated with one or more programs that are included within the database as a database entry, determining whether a plurality of the one or more programs overlap the same time slot; and
    when a plurality of the one or more programs overlap the same time slot, selecting one or more of the plurality of programs overlapping the same time slot, wherein the one or more programs are selected based upon a priority value associated with each of the plurality of programs overlapping the same time slot.

4. The method of claim 3, wherein the priority value associated with each respective one of the plurality of programs overlapping the same time slot is retrieved from a database entry associated with the respective program.

5. The method of claim 1, wherein each database entry comprises program identification information, a time slot associated with the program, and a priority value, and wherein a database entry is created in response to a first viewing of a certain program during a certain time slot, and wherein a priority value associated with a database entry is incremented in response to each subsequent viewing of the associated program during the associated time slot.

6. The method of claim 5, wherein a database entry is created and a priority value associated with a database entry is incremented in response to an associated program being viewed during an associated time slot for at least a threshold duration.

7. The method of claim 1, wherein the calendar item is part of calendar data generated by a calendar application that maintains a digital calendar for one or more users.

8. The method of claim 7, wherein the calendar application is run at a client device.

9. The method of claim 7, wherein the calendar application is run at a cloud-based server.

10. The method of claim 1, wherein the multimedia device provides feedback or an update to a user when the one or more programs are scheduled for recording based upon an identification of a conflict between a calendar entry and a program that is included within the database.

11. A multimedia device, comprising:
    one or more processors configured to:
        determine whether one or more time slots associated with a calendar item overlap or encompass one or more time slots associated with one or more programs that are included within a database as a database entry, wherein the database is maintained at the one or more processors and the one or more programs are programs that have historically been viewed by one or more users; and
        when the one or more time slots associated with the calendar item overlap or encompass one or more time slots associated with one or more programs that are included within the database as a database entry, the one or more processors automatically select for recording, one or more programs from the one or more programs associated with time slots which are overlapped or encompassed by the one or more time slots associated with the calendar item, wherein the one or more programs selected for recording are selected based upon a number of tuners available to the one or more processors and a priority value associated with each of the one or more programs, and schedules a recording of the one or more programs selected for recording.

12. The multimedia device of claim 11, wherein the one or more processors are further configured to:
when the one or more time slots associated with the calendar item overlap or encompass one or more time slots associated with one or more programs that are included within the database as a database entry, determine whether a plurality of the one or more programs overlap the same time slot; and
when a plurality of the one or more programs overlap the same time slot, select one or more of the plurality of programs overlapping the same time slot, wherein the one or more programs are selected based upon a priority value associated with each of the plurality of programs overlapping the same time slot.

13. The multimedia device of claim 11, wherein each database entry comprises program identification information, a time slot associated with the program, and a priority value, and wherein a database entry is created in response to a first viewing of a certain program during a certain time slot, and wherein a priority value associated with a database entry is incremented in response to each subsequent viewing of the associated program during the associated time slot.

14. The multimedia device of claim 11, wherein the calendar item is part of calendar data generated by a calendar application that maintains a digital calendar for one or more users.

15. One or more non-transitory computer readable media having instructions operable to cause one or more processors to perform the operations comprising:
determining, at a multimedia device, whether one or more time slots associated with a calendar item overlap or encompass one or more time slots associated with one or more programs that are included within a database as a database entry, wherein the database is maintained at the multimedia device and the one or more programs are programs that have historically been viewed by one or more users; and
when the one or more time slots associated with the calendar item overlap or encompass one or more time slots associated with one or more programs that are included within the database as a database entry, automatically selecting for recording, by the multimedia device, one or more programs from the one or more programs associated with time slots which are overlapped or encompassed by the one or more time slots associated with the calendar item, wherein the one or more programs selected for recording are automatically selected based upon a number of tuners available to the multimedia device and a priority value associated with each of the one or more programs, and automatically scheduling, by the multimedia device, a recording of the one or more programs selected for recording, wherein the one or more programs are scheduled for recording by the multimedia device.

16. The one or more non-transitory computer-readable media of claim 15, wherein the instructions are further operable to cause the one or more processors to perform the operations comprising:
when the one or more time slots associated with the calendar item overlap or encompass one or more time slots associated with one or more programs that are included within the database as a database entry, determining whether one or more of the one or more programs have already been scheduled for recording; and
when one or more of the one or more programs have already been scheduled for recording, foregoing the scheduling of the recording of the one or more programs that have already been scheduled for recording.

17. The one or more non-transitory computer-readable media of claim 15, wherein the instructions are further operable to cause the one or more processors to perform the operations comprising:
when the one or more time slots associated with the calendar item overlap or encompass one or more time slots associated with one or more programs that are included within the database as a database entry, determining whether a plurality of the one or more programs overlap the same time slot; and
when a plurality of the one or more programs overlap the same time slot, selecting one or more of the plurality of programs overlapping the same time slot, wherein the one or more programs are selected based upon a priority value associated with each of the plurality of programs overlapping the same time slot.

18. The one or more non-transitory computer-readable media of claim 17, wherein the priority value associated with each respective one of the plurality of programs overlapping the same time slot is retrieved from a database entry associated with the respective program.

19. The one or more non-transitory computer-readable media of claim 15, wherein each database entry comprises program identification information, a time slot associated with the program, and a priority value, and wherein a database entry is created in response to a first viewing of a certain program during a certain time slot, and wherein a priority value associated with a database entry is incremented in response to each subsequent viewing of the associated program during the associated time slot.

20. The one or more non-transitory computer-readable media of claim 19, wherein a database entry is created and a priority value associated with a database entry is incremented in response to an associated program being viewed during an associated time slot for at least a threshold duration.

* * * * *